D. J. FARTHING, DEC'D.
W. J. PIERCE, ADMINISTRATOR.
CORN HARVESTER.
APPLICATION FILED JUNE 29, 1918.
1,309,568.
Patented July 8, 1919.
3 SHEETS—SHEET 2.
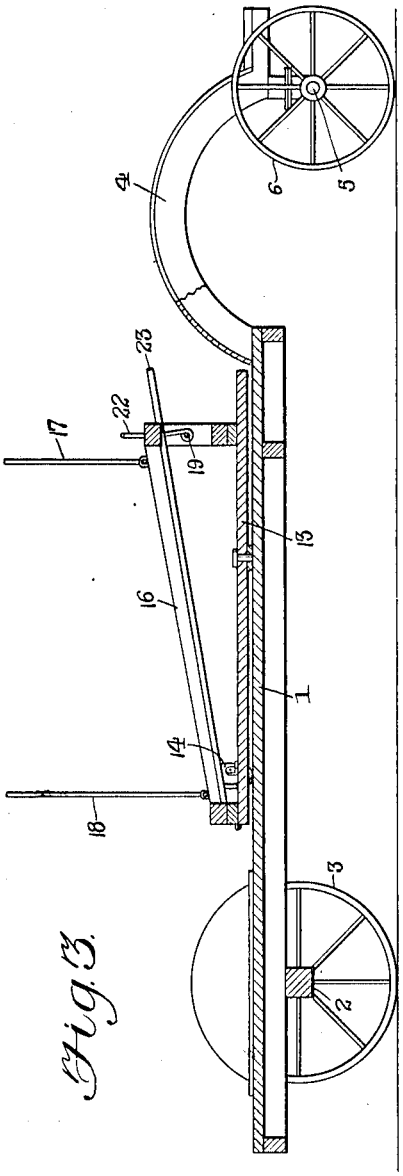
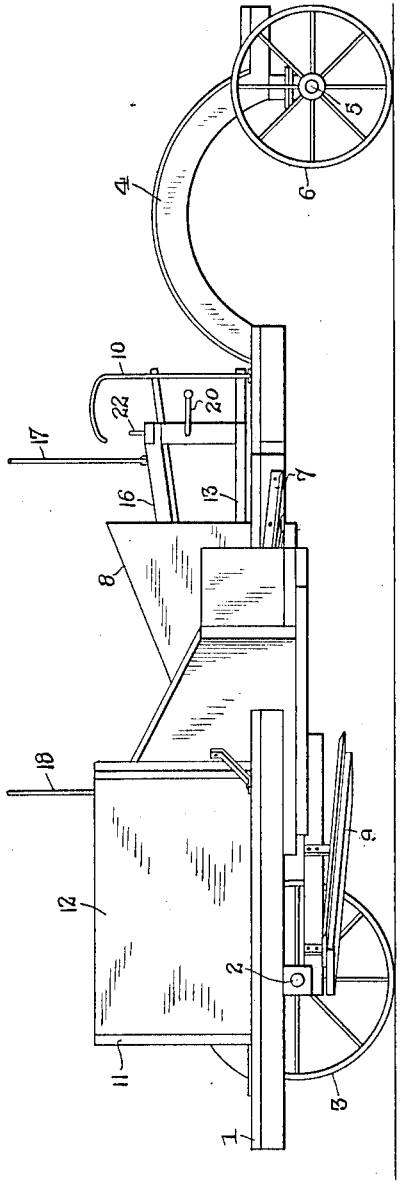
Witnesses
Inventor
D. J. Farthing, Decd.
W. J. Pierce, Administrator.
By Victor J. Evans
Attorney

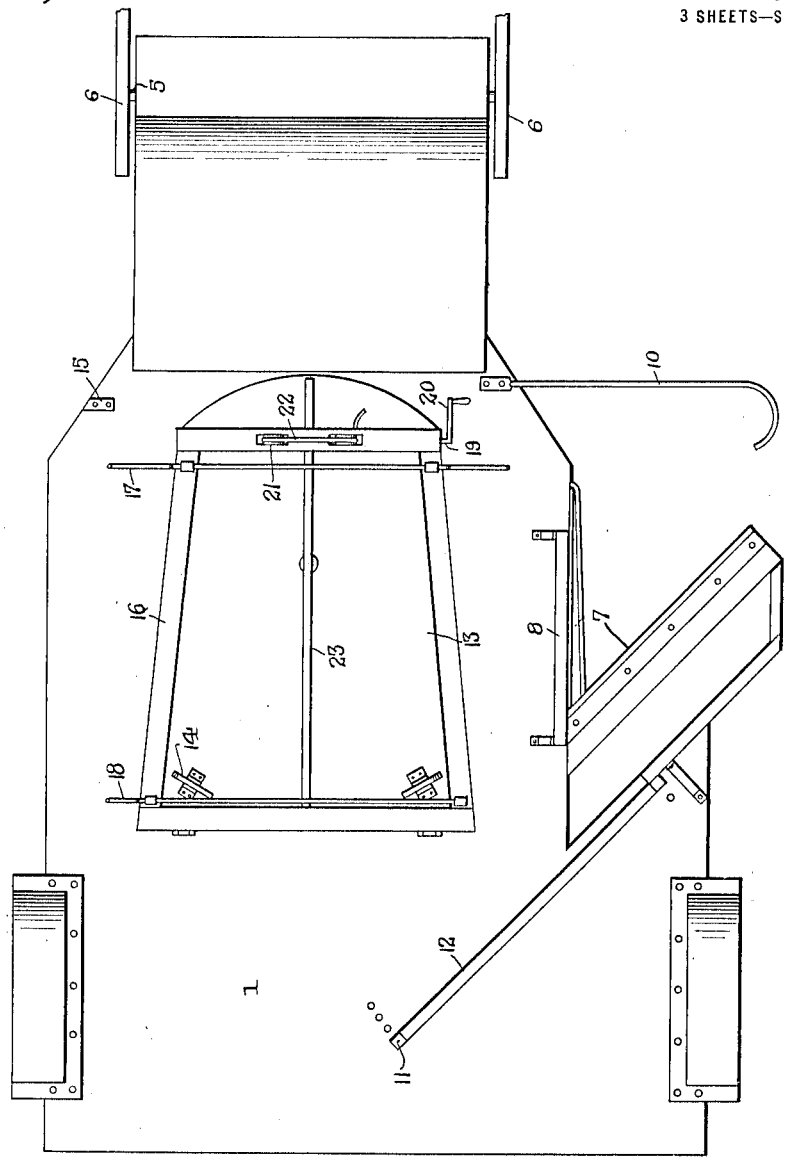

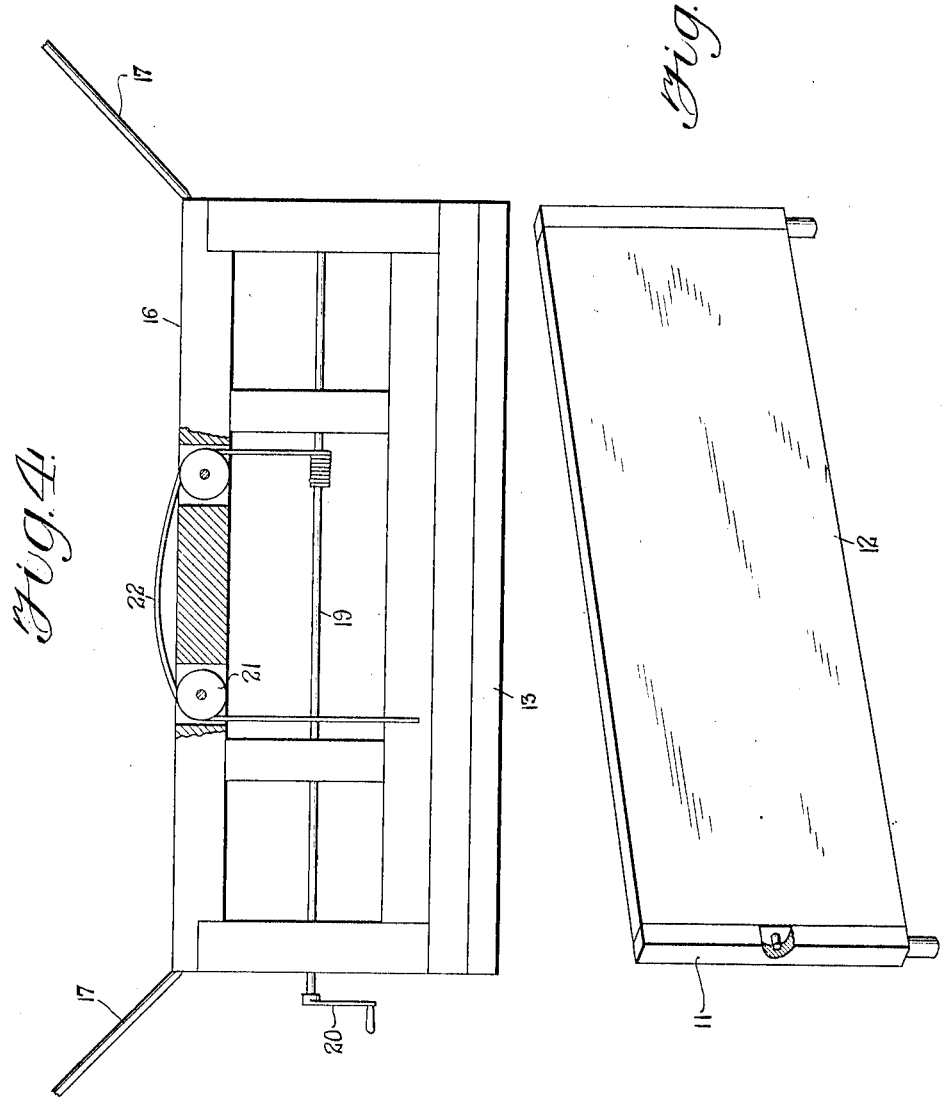

UNITED STATES PATENT OFFICE.

DAVID J. FARTHING, DECEASED, LATE OF BUTLER, TENNESSEE, BY W. J. PIERCE, ADMINISTRATOR, OF BUTLER, TENNESSEE, ASSIGNOR, BY DIRECT AND MESNE ASSIGNMENTS, OF ONE-THIRD TO J. E. REECE AND ONE-THIRD TO ASA C. REECE, BOTH OF BUTLER, TENNESSEE.

CORN-HARVESTER.

1,309,568.     Specification of Letters Patent.     Patented July 8, 1919.

Application filed June 29, 1918. Serial No. 242,638.

*To all whom it may concern:*

Be it known that DAVID J. FARTHING, deceased, late a citizen of the United States, residing at Butler, in the county of Johnson and State of Tennessee, invented new and useful Improvements in Corn-Harvesters, of which the following is a specification.

This invention relates to corn harvesters and it consists in the novel features hereinafter described and claimed.

An object of the invention is to provide a harvester of the character stated which is of simple and durable structure and which includes means for severing the stalk in the vicinity of the surface of the soil. Also means for directing the stalk upon the body of the machine and a holder in which the stalks may be deposited preparatory to placing them upon the ground in the form of a shock. The said holder is mounted upon a pivoted platform and is adapted to swing so that the bundle of stalks may be delivered from the machine at one side, the delivery side being opposite that side at which the stalks are cut.

In the accompanying drawing—

Figure 1 is a top plan view of the corn harvester.

Fig. 2 is a side elevation of the same.

Fig. 3 is a vertical longitudinal sectional view of the same.

Fig. 4 is a detail vertical transverse sectional view of the same.

Fig. 5 is a detail perspective view of the panel and the standards.

The corn harvester comprises a flat body or platform 1 which is mounted at its rear portion upon a relatively long transversely disposed axle 2. Wheels 3 are journaled at the end portions of the axle 2. An arch structure 4 is attached to the forward end of the platform 1 and an axle 5 is pivoted under the said structure 4. Wheels 6 are journaled at the ends of the axle 5 in a usual manner.

A longitudinally arranged forwardly and downwardly inclined blade 7 is located at one side edge of the platform 1 and a vertical longitudinally arranged stalk guiding or directing partition 8 is located upon the platform behind the said blade 7. An obliquely arranged forwardly and downwardly inclined blade 9 is located under the same side of the platform but the blade 9 is at a lower position than the blade 7 and is disposed at an angle of about 45 degrees with reference thereto, said blades converging at their inner ends. A stalk bending arm 10 is mounted upon the platform 1 and is located above and in advance of the blades 7 and 9. As the machine is moved over the ground the arm 10 encounters the standing stalks and bends them in a forward direction. When the blade 7 encounters the stalks they are severed from the stump portion and the said stalks are directed by the guides 8 upon the upper surface of the platform 1. The blade 9 encounters the stumps of the stalks in the vicinity of the surface of the soil and cuts the stumps from the root and the said stumps are permitted to remain upon the soil. Consequently the corn is removed from the ground at the surface thereof but the heavier stump portion of the stalk is not harvested.

Standards 11 are adjustably mounted upon the platform 1 and a panel 12 is pivotally connected with the said standards. The said panel is adapted to direct the stalks upon the intermediate portion of the platform and inasmuch as the standards are adjustably mounted upon the platform, they may be shifted so that the panel may be disposed at a desired angle with relation to the line of draft of the machine to properly direct the stalks and the panel may be swung with relation to the standards to assist in the directing or guiding of the stalks as just indicated.

A table 13 is pivotally mounted upon the platform 1 and one end portion of the said table is supported by rollers 14 which are adapted to move over the surface of the platform. A stop 15 is mounted upon the platform and is located in the path of movement of the table whereby the turning movement of the table is limited.

A frame 16 is hingedly mounted upon the table 15 and carries at one end portion diverging arms 17 and at its opposite end portion an arm 18. A shaft 19 is journaled upon the frame 16 and is provided at one end with a crank handle 20. Pulleys 21 are journaled upon the frame 16 and a cable 22 is arranged to wind at one end upon the shaft 19 and the intermediate portion of the said cable is trained about the pulleys 21. The frame 16 is provided with a handle shaft 23 which may be used for swinging the frame with relation to the table.

As the stalks are delivered upon the surface of the platform an operator who stands upon the platform picks them up and lays them on the frame 16 between the arms 17 and at one side of the arm 18. When a suitable number of stalks have been gathered or collected upon the frame 16 the intermediate portion of the cable 22 is looped around the assemblage of stalks and the slip knot made so that as the cable is wound upon the shaft 19 the stalks are drawn together in a compact bunch or bundle. This bundle may then be bound by passing a wire around the same and tying its ends in the usual manner. Thus the shock is completed and rests upon the upper surface of the frame 16. The table 13 is then turned so that the butt ends of the stalks are disposed at one side of the platform 1 and then by using the handle shaft 23 the frame is swung from a substantially horizontal position to an upright position whereby the shock is carried beyond the edge of the platform and is deposited with the butt ends of the stalks upon the ground.

As the machine continues on its course over the field the frame is moved away from the shock which is left standing and the parts are returned to their normal positions and the operation above described is repeated.

From the foregoing description taken in conjunction with the accompanying drawings it will be seen that a corn harvester or shocking machine of simple and durable structure is provided and that the same may be easily and conveniently used for assembling stalks and placing them upon the ground in the form of a shock.

Having described the invention what is claimed is:—

1. In a corn harvester, a wheel mounted platform, a longitudinally arranged forwardly and downwardly inclined blade, at one side edge of the platform, stalk guiding means located above and slightly behind said blade, an obliquely arranged blade disposed beneath the platform and at an angle to the first named blade and obliquely arranged stalkguiding means extending inwardly over the platform and spaced from the rear end of the first named stalk guiding means.

2. In a corn harvester, a wheel mounted platform, a longitudinally arranged forwardly and downwardly inclined blade at one side edge of the platform, stalk guiding means located above and slightly behind said blade, an obliquely arranged blade carried by the platform and at an angle to the first named blade, and obliquely arranged stalk guiding means extending inwardly over the platform and spaced from the rear end of the first named stalkguiding means, the said second named blade being arranged at a lower plane than the first named blade.

3. In a corn harvester, a wheel mounted platform, a longitudinally arranged forwardly and downwardly inclined blade, at one side edge of the platform, stalk guiding means carried by the platform and arranged adjacent said blade, a second blade secured to the underside of the platform and disposed at an angle with respect to the first mentioned blade, a stalk guiding partition mounted upon the platform and spaced from the rear end of the said stalk guiding means, and said partition being mounted to be arranged at different angles with regard to the line of draft.

In testimony whereof I affix my signature.

W. J. PIERCE,
*Administrator of David J. Farthing, deceased.*